United States Patent
Murphy

(10) Patent No.: US 12,339,169 B2
(45) Date of Patent: Jun. 24, 2025

(54) COLOR MEASUREMENT

(71) Applicant: AXALTA COATING SYSTEMS IP CO., LLC, Wilmington, DE (US)

(72) Inventor: Neil Richard Murphy, Audubon, NJ (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 557 days.

(21) Appl. No.: 17/650,398

(22) Filed: Feb. 9, 2022

(65) Prior Publication Data
US 2023/0251137 A1    Aug. 10, 2023

(51) Int. Cl.
*G01J 3/50* (2006.01)
*G01J 3/02* (2006.01)
*G01N 21/84* (2006.01)

(52) U.S. Cl.
CPC .............. *G01J 3/50* (2013.01); *G01J 3/0202* (2013.01); *G01J 3/0278* (2013.01); *G01N 21/8422* (2013.01); *G01N 2021/8427* (2013.01)

(58) Field of Classification Search
None
See application file for complete search history.

(56) References Cited

U.S. PATENT DOCUMENTS

2002/0005954 A1* 1/2002 Sperling ............... G01J 3/50
356/446
2009/0027673 A1* 1/2009 Baker ................... G01J 3/027
356/402
2015/0160122 A1* 6/2015 Moy ................... G01N 1/2813
73/150 R
2022/0146315 A1* 5/2022 Furuya ................ G01J 3/0262

FOREIGN PATENT DOCUMENTS

DE        2525701 A1    12/1976
WO    2013173401 A1    11/2013

OTHER PUBLICATIONS

EPO, European Extended Search Report issued in EP App. No. 23154857.9, dated May 24, 2023.

* cited by examiner

*Primary Examiner* — Shamim Ahmed
*Assistant Examiner* — Bradford M Gates
(74) *Attorney, Agent, or Firm* — Lorenz & Kopf, LLP

(57) ABSTRACT

Methods and assemblies for aligning an optical device with a surface configured to receive a liquid coating and for measuring a parameter of a liquid coating are provided. An exemplary method for measuring a parameter of a liquid coating includes providing a mechanical carriage connected to a surface configured to receive a layer of the liquid coating. An exemplary mechanical carriage is configured to move to and from an operative configuration located at a set distance and orientation with respect to the surface. The method further includes locating an optical device in the mechanical carriage. Also, the method includes adjusting an orientation of the optical device within the mechanical carriage to an aligned orientation based on a relationship between the surface and a mechanical alignment feature on the optical device. The method further includes performing a parameter measurement operation with the optical device in the aligned orientation.

11 Claims, 6 Drawing Sheets

COLOR MEASUREMENT

TECHNICAL FIELD

The technical field generally relates to methods and assemblies for measuring wet color parameters, and more particularly relates to the alignment of devices for performing wet color measurements.

BACKGROUND

Typically, during the manufacturing of coating compositions, such as automotive OEM or refinish paints, from time to time, an aliquot of such coating compositions being manufactured is taken, applied as a layer of desired thickness over a test substrate, dried and/or cured into a coating and is measured. The process parameters are then adjusted and the described testing procedure is repeated until the adjusted coating composition meets the measurement requirements.

The aforementioned testing procedure is not only time consuming and cumbersome but it also results in frequent interruptions in the manufacturing process. As a result, the batch-to-batch quality of the resulting coating compositions can be affected detrimentally. Several methods have been developed to measure optical properties of a layer from a coating composition in its wet state that correlate to the gloss that can result when such a layer dries and/or cures into a coating.

However, there are issues with the standardization and repeatability of testing of wet layers, as with as with the time required to ensure standardized testing. Accordingly, there is a need for the development of assemblies and methods for performing parameter measurement operations in standardized alignment. Further, there is a need for such assemblies and methods that provide for rapid use. Furthermore, other desirable features and characteristics will become apparent from the subsequent detailed description and the appended claims, taken in conjunction with the accompanying drawings and the foregoing technical field and background.

SUMMARY

In one embodiment, an exemplary method for measuring a parameter of a liquid coating is provided. The method includes providing a mechanical carriage connected to a surface configured to receive a layer of the liquid coating. An exemplary mechanical carriage is configured to move to and from an operative configuration located at a set distance and orientation with respect to the surface. The method further includes locating an optical device in the mechanical carriage. Also, the method includes adjusting an orientation of the optical device within the mechanical carriage to an aligned orientation based on a relationship between the surface and a mechanical alignment feature on the optical device. The method further includes performing a parameter measurement operation with the optical device in the aligned orientation.

In another embodiment, a method for aligning an optical device with a surface configured to receive a liquid coating is provided. The method includes locating a removable mechanical alignment feature between a face of the optical device and the surface. Also, the method includes moving the optical device and/or the surface to establish a selected distance therebetween. The method further includes adjusting an orientation of the optical device to an aligned orientation based on a relationship between the removable mechanical alignment feature, the optical device, and the surface. Further, the method includes increasing a distance between the optical device and the surface, and removing the removable mechanical alignment feature. The method also includes moving back the optical device and/or the surface to re-establish the selected distance therebetween.

In another embodiment, an assembly is provided for performing standardized parameter measurements. The assembly includes a plurality of optical devices, wherein each optical device has a face. The assembly also includes a mechanical carriage connected to a surface configured to receive a layer of a liquid coating, wherein the mechanical carriage is configured to move to and from an operative configuration located at a set distance and orientation with respect to the surface, and wherein the mechanical carriage is configured to receive each optical device. Further, the assembly includes a removable mechanical alignment feature configured to be temporarily retained on the face of each optical device. Also, the assembly includes an adjustment feature configured to adjust an orientation of each optical device within the mechanical carriage to an aligned orientation based on a relationship between the surface and the removable mechanical alignment feature.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present embodiments will hereinafter be described in conjunction with the following drawing figures, wherein like numerals denote like elements, and wherein.

DETAILED DESCRIPTION

Figure 1:
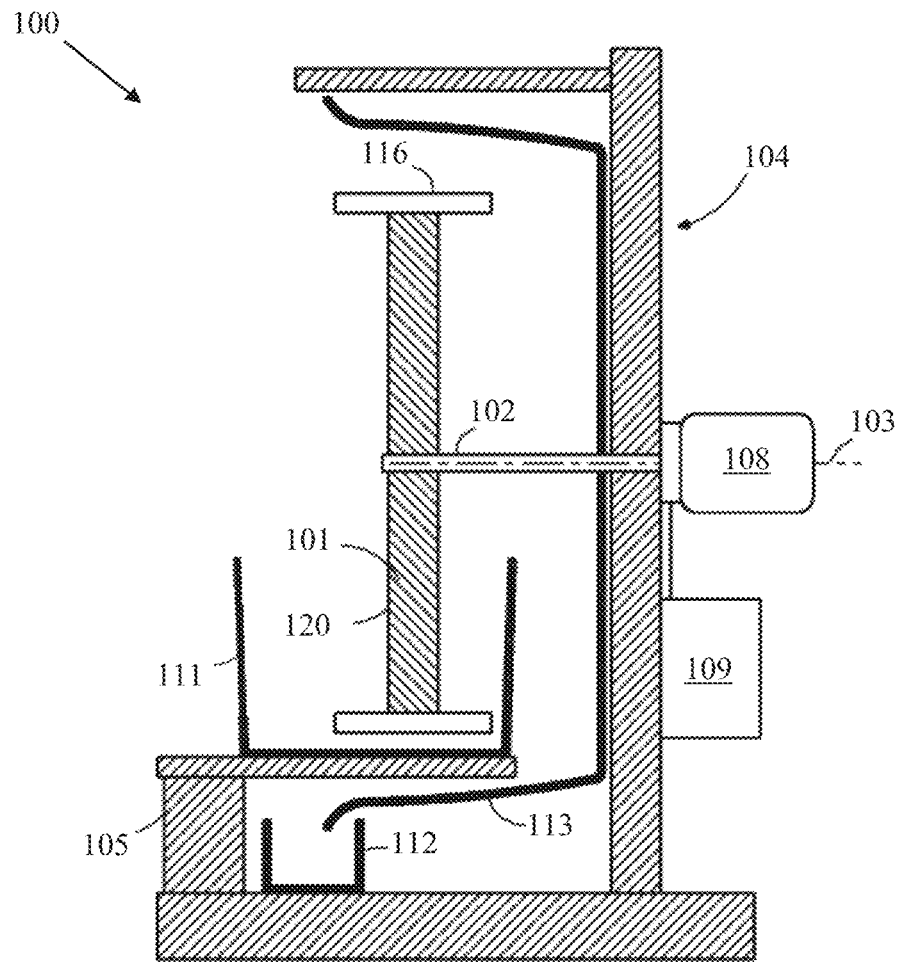
FIG. 1 is a schematic cross-sectional diagram of a device for holding a liquid coating on a surface to be measured in accordance with exemplary embodiments.

The following detailed description is merely exemplary in nature and is not intended to limit the devices and methods as described herein. Furthermore, there is no intention to be bound by any theory presented in the preceding background or summary or in the following detailed description.

As used herein, "a," "an," or "the" means one or more unless otherwise specified. The term "or" can be conjunctive or disjunctive. Open terms such as "include," "including," "contain," "containing" and the like mean "comprising." In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as being modified by the word "about" or may be understood as being not modified by the word "about". As used herein, the "%" or "percent" described in the present disclosure refers to the weight percentage unless otherwise indicated.

Embodiments herein are related to methods and assemblies for performing wet color measurements. While embodiments are provided of such measurements performed on liquid coatings formed as a layer on a spinning disk, such embodiments are merely descriptive and are not limiting.

Further, methods and assemblies described herein for measuring optical parameters of liquid coatings are not subject to any limitations as regards the nature of the liquid coating. Exemplary methods can be used for measuring optical, especially colorimetric, parameters on any types of liquid coating. The liquid coating may be, for example, color-giving lacquers pigmented with absorption pigments, so-called plain lacquers, metal-effect lacquers pigmented with metal pigments, for example aluminum pigments, and, optionally, other pigments, or special-effect lacquers pigmented with interference pigments or any other special-effect pigments. The liquid coatings may contain any desired types of pigment in combination with one another. The measurements may be carried out both on solvent-based and on water-based liquid coatings. The further composition of the liquid coatings, for example in respect of binders, additives, and other constituents, is not important. The liquid coatings must simply be such that they can be applied without difficulty to the cylindrical support, and the formation of a homogeneous film is ensured.

Exemplary methods allow measurements, such as wet color measurements, to be carried out on wet liquid coatings rapidly and effectively and with the required accuracy of measurement, irrespective of the color-measuring device used.

Exemplary methods may be used in the coating industry both in the case of quality assurance in coating manufacture and coating standardization, and in the various development stages of coating development. For example, methods may be used in the evaluation of intermediate results in coloring processes in coating manufacture and coating standardization, for example in the production of standardized mixed coatings or standardized pigment pastes. In such processes, intermediate values are determined which are still relatively far removed from the end result, and it is therefore to be possible to determine them rapidly and effectively but with the required accuracy.

Exemplary methods may also be used, for example, in the field of printing inks. Of course, exemplary methods and the devices for carrying out such methods may in principle be used also in any other fields of application in which, in general, optical and, especially, colorimetric measurements on colored, liquid media are required.

Generally, wet color measurement allows for significant time savings as compared to dry measurement, as the user may compare wet batches to ensure proper color position without waiting for drying. Exemplary wet color measurement hardware includes a spectrophotometer, a mechanical carriage to hold the spectrophotometer a fixed distance from the wet paint layer, and a spinning disk that achieves a planar wet paint layer. The distance between the spectrophotometer port and the wet paint layer must be consistent among all spectrophotometers to ensure operation within required testing tolerances.

Currently, the measurement distance is set using an iterative process that requires measurement of a reference wet paint, followed by manual adjustment of carriage relative to the liquid surface. Such a measurement configuration requires a very complex alignment procedure that is time consuming, prone to error, and difficult to repeat without a significant level of training.

Therefore, embodiments herein provide a simplified method and assembly for providing repeatable alignment of devices and testing by those devices. For example, embodiments herein include a removable, temporarily-affixed mechanical alignment fixture placed between the spectrophotometer face and the disk surface that is able ensure that the spectrophotometer port is parallel to the surface of the wet paint surface and held at the proper distance therefrom.

To ensure that the planar surfaces of the spectrophotometer face and the spinning disk are parallel, exemplary assemblies include a mechanical alignment feature providing three points of contact and having uniform critical dimensions, such as three spheres of uniform diameter. The use of three points of contact constrains rotation of along the x, y, and z axes. The uniform diameter of the spheres constrains distance between the spectrophotometer face and the spinning disk in the z direction. Further, translation in the x and y directions of the spectrophotometer is constrained by the mechanical carriage in which the spectrophotometer sits.

In exemplary embodiments, alignment of the spectrophotometer and disk surface is performed by manual mechanical adjustment, such as adjustment of micrometer screws, or similar adjustment devices capable of precise and repeatable geometry modification, interconnecting the carriage and spectrophotometer until all three spheres are in contact with the disk surface. If the plane of the disk is not fully parallel to the plane of the spectrophotometer face due to one side being closer in distance to another, the spheres on the opposing side will no longer contact the disk surface. This method of alignment ensures that the spectrophotometer is directly aligned to the disk surface, mitigating any variability between spectrophotometers, disks, and carriages. Embodiments herein streamline the alignment and ensure less waste by not requiring the use of wet paint. In other words, the alignment process is performed before, and without, the application of any paint on the disk surface. Further, embodiments herein eliminate the variability associated with wet measurement that is endemic to current alignment processes. Specifically, by directly aligning the spectrophotometer face to the wet measurement surface, the main sources of variation are reduced to wet paint and spectrophotometer noise. Also, embodiments provide for rapid alignment and allow for a more robust backup situation where a broken or non-operational instrument can be quickly switched out with a new one to ensure minimal downtime in high volume production facilities.

Referring to FIG. 1, a device 100 for holding a liquid coating for measurement of a parameter thereof is illustrated. An exemplary device 100 is a thin film device for producing a thin film of the liquid coating on a planar surface 120, such as a surface 120 of a spinning disk 101.

As shown, the exemplary disk 101 is coupled to a rotation shaft 102 that is aligned with a rotational axis 103 of the disk 101 perpendicular to the disk surface 120 for providing rotation to the disk 101 around the rotational axis 103.

An exemplary device 100 further includes a device frame 104 that holds the rotation shaft 102 and disk 101. An exemplary device 100 further includes a motion device 108 coupled to the rotation shaft 102 for providing rotation to the rotation shaft 102, and a motion control device 109 for controlling rotation speed, rotation direction, or a combination thereof, of the motion device 108.

An exemplary device 100 further includes a reservoir 111 for storing the liquid applied to surface 120. The reservoir 111 can be configured so that the liquid, when present in the reservoir 111, is in contact with at least a portion of the planar surface 120. An exemplary device 100 may further include a reservoir 112 and a retainer 113. The reservoir 112 can be positioned to collect overflow of the liquid, when present, retained by the retainer 113. The retainer 113 can be affixed to the device frame 104. The device frame 104 can have a frame base 105 that can have one or more tiers for positioning the reservoirs 111 and 112.

The disk 101 can be a circular disk and can further comprise a circular retaining barrier 116 positioned at the circular edge of the disk 101. The circular retaining barrier 116 can be a belt around the edge of the disk 101, a circular grove or a curved edge, a protrusion around the edge of the disk 101, or a combination thereof. A non-circular disk 101 can also be suitable when the non-circular disk has at least a circular portion that is rotationally symmetric to the rotational axis 110. The thin film 102 can be formed on such a circular portion.

The disk 101 can be so positioned that the liquid, when present, can be moved by the disk, when in rotation, from the reservoir 111 to a thin film setting edge (not shown) against gravity. The planar surface 120 can be made of stainless steel, polymers, plastics, glass, or a combination thereof. The planar surface 120 should be suitable for forming a thin film of the liquid thereon having essentially even thickness for at least a portion of the planar surface 120 large enough for measuring properties of the liquid.

Figure 2:
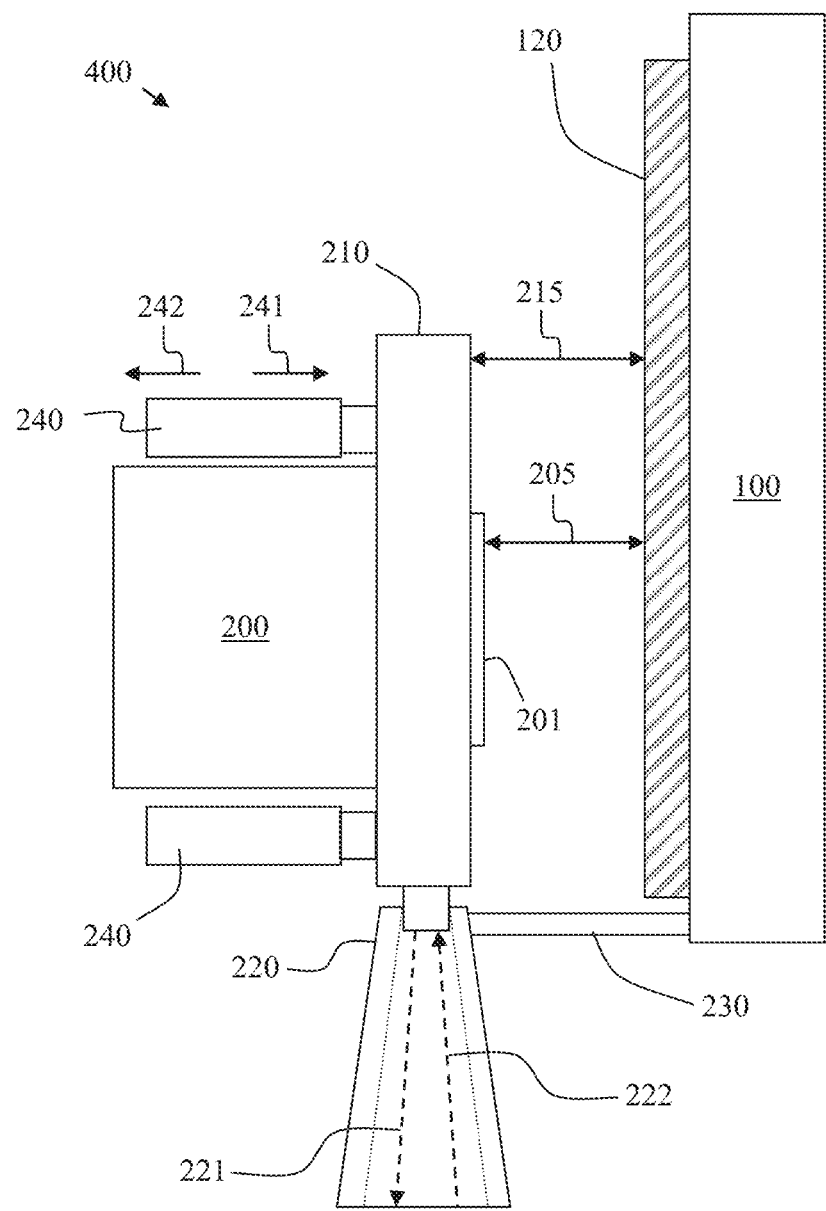
FIG. 2 is a schematic cross-sectional diagram of the surface of FIG. 1 and an optical device for measuring a parameter of a liquid coating on the surface in accordance with exemplary embodiments.

Referring now to FIG. 2, the liquid surface 120 on the device 100 from FIG. 1 is illustrated with respect to an embodiment of an optical device 200 for measuring a parameter of a liquid located on surface 120. An exemplary optical device is a spectrophotometer, though other optical devices may be used.

As shown, the optical device 200 is received in a mechanical carriage 210. The mechanical carriage 210 may be movably mounted to a rail 220. In the illustrated embodiment, the mechanical carriage 210 is received and supported by rail 220 for movement in direction 221 and 222, substantially parallel to surface 120. Other embodiments may be arranged for movement of the mechanical carriage 210 perpendicularly to surface 120.

As shown, rail 220 is fixed to the device 100 by interconnection 230. With this connection, the spatial relationship between the mechanical carriage 210 and the surface 120 is limited. Specifically, the mechanical carriage 210 may be located in an operative configuration, such as is shown in FIG. 2, or the mechanical carriage 210 may be moved toward the viewer, i.e., in direction 221 laterally away from device 100 and surface 120 to a non-operative configuration.

As shown, optical device 200 has a face 201 in which a port (not shown in FIG. 1) is located for sending an optical beam directed toward surface 120 and for receiving a reflected beam from surface 120.

When in the operative configuration, as shown, a distance 205 is established between surface 120 and the face 201 of the optical device 200. Further, when in the operative configuration, as shown, a distance 215 is established between surface 120 and the mechanical carriage 210. While in FIG. 2, the optical device 200 protrudes from the mechanical carriage 210 such that distance 205 is less than distance 215, it is contemplated that the optical device 200 be recessed within a frame of the mechanical carriage 210 such that distance 205 is greater than distance 215

It is noted that the mechanical carriage 210 is configured to return precisely to the operative configuration such that mechanical carriage 210 may be moved in direction 221 and then moved back in direction 222 to return the mechanical carriage 210 to distance 215 from the surface 120.

In order to adjust distance 205 and to adjust the orientation of the face 201 of the optical device 200, adjustment features 240 are provided. Exemplary adjustment features are micrometers or similar extendible/retractable structures. In an exemplary embodiment, the adjustment features 240 interconnect the optical device 200 and the mechanical carriage 210 and allow for adjustment of the optical device 200 with respect to the mechanical carriage 210. Thus, when the mechanical carriage 210 is located at a distance 215 from surface 120, the distance 205 between the surface 120 and the face 201 of the optical device 200 may be adjusted.

In exemplary embodiments, three adjustment features 240 are provided and interconnect the optical device 200 and the mechanical carriage 210. Each adjustment feature 240 is independently able to move the optical device 200 in direction 241 (toward surface 120) or in direction 242 (away from surface 120). Thus, not just distance 205, but the orientation of the face 201 of the optical device 200 with respect to surface 120 may be adjusted. For example, a first adjustment feature 240 may be extended to push a first end of the face 210 toward the surface 120 while a second adjustment feature 240 may be withdrawn to pull a second end of the face 210 away from the surface 120. In this manner, the face 201 may be adjusted to a desired orientation, such as parallel to surface 120.

Figure 3:
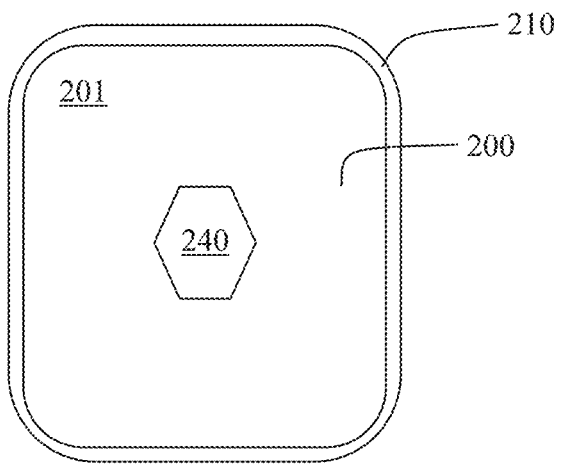
FIG. 3 is a schematic diagram of a face of the optical device of FIG. 2 in accordance with exemplary embodiments.
Figure 4:
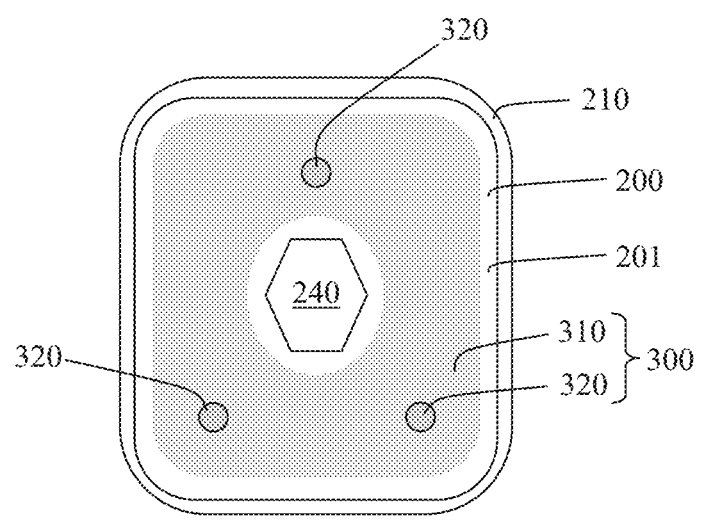
FIG. 4 is a schematic diagram of the face of the optical device of FIG. 3, with a mechanical alignment feature applied thereto in accordance with exemplary embodiments.

Referring now to FIG. 3, the face 201 of optical device 200 is shown to include a port 240. As shown, the optical device 200 may be surrounded by a frame portion of the mechanical carriage 210.

As shown in FIG. 3, a mechanical alignment feature 300 may be applied to the face 201 of the optical device 200. The exemplary mechanical alignment feature 300 includes three protrusions 320. The mechanical alignment feature 300 may optionally include a layer 310 configured to selectively fix or hold the protrusions 320 onto the face 201. For example, the layer 310 may be a double-sided adhesive layer that adheres to the face 201 and to the protrusions 320. If used, the layer 310 may include a void over the port 240 as shown.

Other methods of fixing or holding the protrusions 320 onto the face 201 are contemplated. For example, the protrusions 320 may be formed with an adhesive surface or surfaces. Alternatively, the optical face 201 may be formed with magnetic/metallic regions for holding metallic/magnetic protrusions 320. It is also contemplated that the face 201 be formed with grooves or other features for engagement with the protrusions 320.

Exemplary protrusions 320 are spheres, though other shapes are contemplated. For example, protrusions 320 may be pyramidal, cubic, cylindrical, or other shapes. Exemplary protrusions 320 have an identical critical dimension, such as diameter for spherical protrusions or height for pyramidal or other shaped protrusions 320. As a result, a plane defined by the furthest surface of each protrusion 320 from the face 201 is parallel to the face 201.

Further, if used, layer 310 has a consistent thickness or is compressible to a consistent thickness such that a plane defined by the furthest surface of each protrusion from the face 201 is parallel to the face 201.

Figure 5:
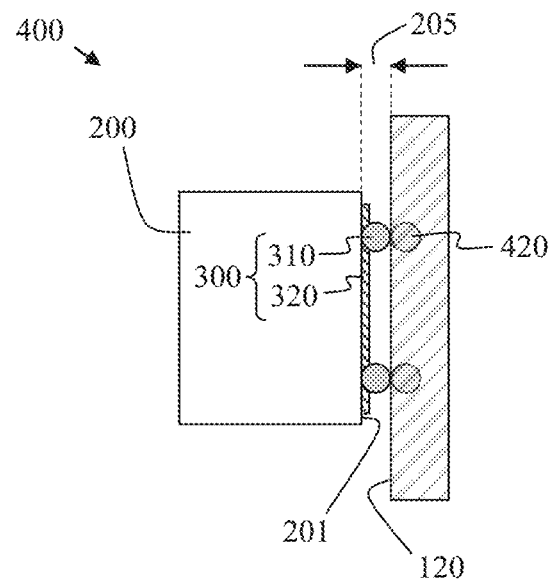
FIG. 5 is schematic cross-sectional diagram illustrating a method for aligning the optical device of FIG. 4 with a surface in accordance with exemplary embodiments.

Cross-referencing FIGS. 2 and 5, use of the mechanical alignment feature 300 to align the face 201 of the optic device 200 with the surface 120 is explained. As shown in FIG. 5, protrusions 320 are held to the face 201 of the optical device 200 by layer 310. The mechanical carriage 210 is brought to the operative configuration such that the mechanical carriage 210 is distance 215 from surface 120, as shown in FIG. 2. Then, adjustment features 240 are manipulated to increase or decrease the distance 205 between portions of face 201 and surface 120. Such adjustment continues until each protrusion 320 contacts surface 120. Contact between each protrusion 320 and surface 120 can be monitored visually. Specifically, when a protrusion 320 contacts surface 120, a reflection 420 of the protrusion 320 in surface 120 appears to touch the protrusion 320. In FIG. 5, each reflection 420 appears to contact the respective protrusion 320. In addition to visual alignment using reflected images of the protrusion surface, alignment using electrical resistivity, pressure sensors, or electronic switches, can also be used.

Figure 6:
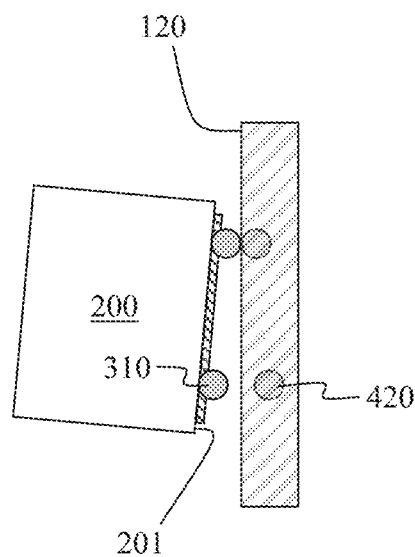
FIG. 6 is schematic cross-sectional diagram illustrating a misalignment of the optical device of FIG. 4 with a surface.

FIG. 6 illustrates an exaggerated improper orientation of face 201 such that one protrusion 320 does not contact surface 120. As shown, the reflection 420 of the non-contacted protrusion 320 appears to be distanced from the non-contacted protrusion 320.

Figure 7:
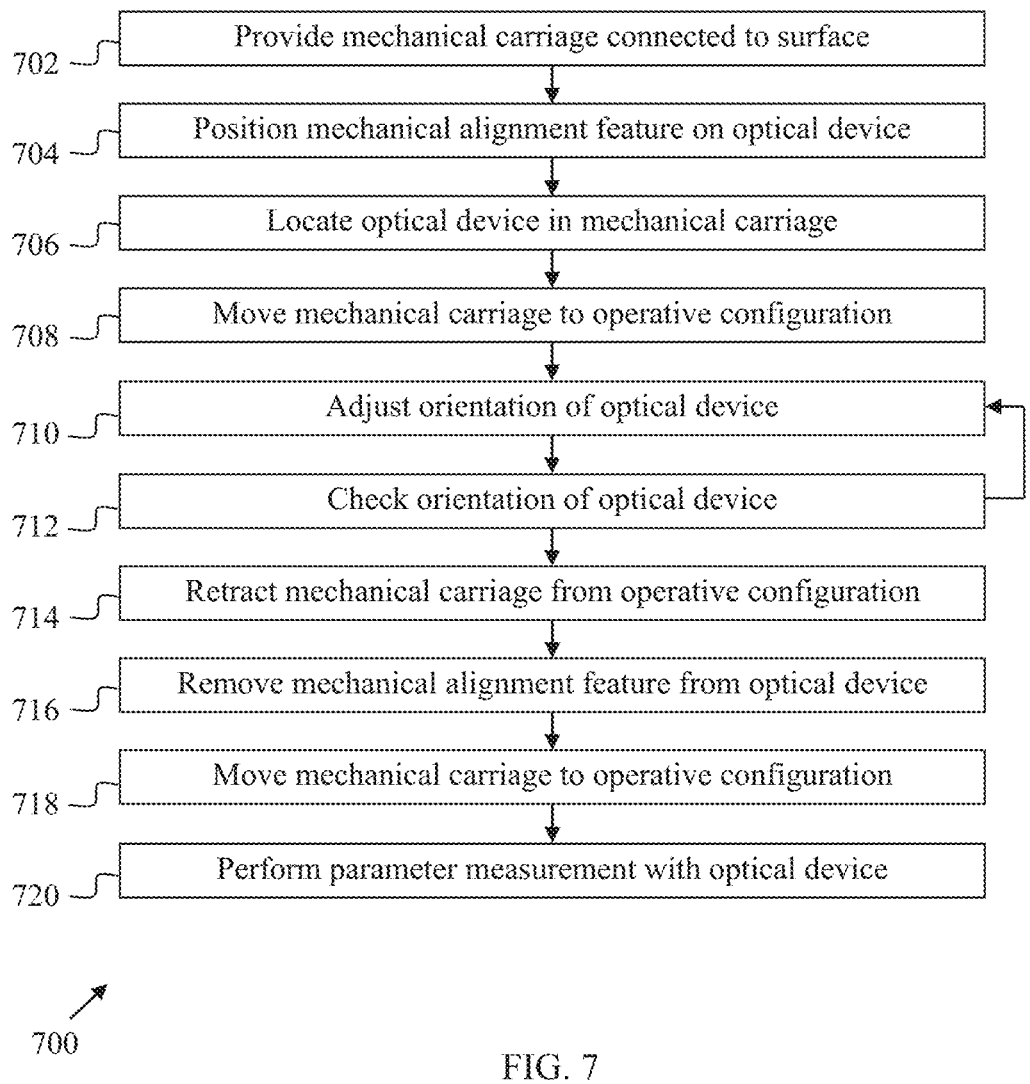
FIG. 7 is a flow chart illustrating a method for measuring a parameter of a liquid coating in accordance with exemplary embodiments.

With this understanding of the structures above, a method 700 for measuring a parameter of a liquid coating is described in FIG. 7, with reference to FIGS. 1-6. In FIG. 7, method 700 is shown to include, at operation 702, providing a mechanical carriage 210 connected to a surface 120 configured to receive a layer of the liquid coating. The mechanical carriage 210 is configured to move to and from an operative configuration located at a set distance 215 and orientation with respect to the surface 120. As indicated in FIG. 2, the mechanical carriage 210 is indirectly connected to the surface 120 through interconnection 230.

Method 700 may continue at operation 704 with positioning a mechanical alignment feature 300 on the face 201 of the optical device 200.

Method 700 may further continue at operation 706 with locating the optical device 200 in the mechanical carriage 210. IN exemplary embodiments, the optical device 200 is placed into the mechanical carriage 210 while the mechanical carriage 210 is retracted from the operative configuration.

At operation 708, method 700 includes moving the mechanical carriage 210 to the operative configuration, such as is shown in FIG. 2. In the operative configuration, the mechanical carriage 210 is set at distance 215 from surface 120.

At operation 710, method 700 includes adjusting an orientation of the optical device 200 within the mechanical carriage 210 to an aligned orientation based on a relationship between the surface 120 and the mechanical alignment feature 300 on the optical device 200. For example, adjustment features 240 may be manipulated to extend and retract ends of the face 201 such that each protrusion 320 of the mechanical alignment feature 300 contacts the surface 120. In exemplary embodiments, the adjustment features 240 are micrometers that interconnect the optical device 200 to the mechanical carriage 120, and adjusting the orientation of the optical device 200 within the mechanical carriage 120 includes independently adjusting the micrometers.

Operation 712 of method 700 includes checking the orientation of the optical device 200. Specifically, operation 712 may include visually checking the interface between the surface 120 and the mechanical alignment feature 300 to visually observe that the reflection 420 of each protrusion 320 appears to contact each respective protrusion 320. If the optical device 200 is not at the proper orientation, i.e., if face 201 is not parallel to surface 120, then the method 700 returns to operation 710.

When the optical device 200 is at the proper orientation, i.e., when face 201 is parallel to surface 120, then the method 700 continues with operation 714, which includes retracting the mechanical carriage 210 from the operative configuration. For example, in FIG. 2, the mechanical carriage 210 may be moved in direction 221 along rail 220. Such operation allows for a user access to the face 201 and the mechanical alignment feature 300.

At operation 716, method 700 includes removing the mechanical alignment feature 300 from the face 201 of the optical device 200. In embodiments in which a layer 310 and protrusions are used, both the layer 310 and the protrusions 320 may be removed. Alternatively, only the protrusions 320 may be removed. Typically, removal of the mechanical alignment feature 300 may be performed simply by grasping and pulling the protrusions 320 and/or the layer 310 from the face 201.

After removing the mechanical alignment feature 300 from the face 201 of the optical device 200, method 700 includes, at operation 718, moving the mechanical carriage 210 back to the operative configuration, i.e., to distance 215 from the surface 120. As shown in FIG. 2, the mechanical carriage 210 is moved in direction 222 when returned to the operative configuration.

When the mechanical carriage 210 returns to the operative configuration, the face 201 of the optical device 200 returns to the aligned orientation achieved in operation 710.

Method 700 then continues, at operation 720, with performing, with the optical device in the aligned orientation, the parameter measurement. For example, gloss, multi-angle color, multi-angle reflection, highspeed video, layer uniformity, layer opacity, pigment concentration, coating appearance, and/or sparkle information may be measured. In exemplary embodiments, the optical device is a spectrophotometer, and the measurement process performed with the spectrophotometer obtains a wet color measurement.

Figure 8:
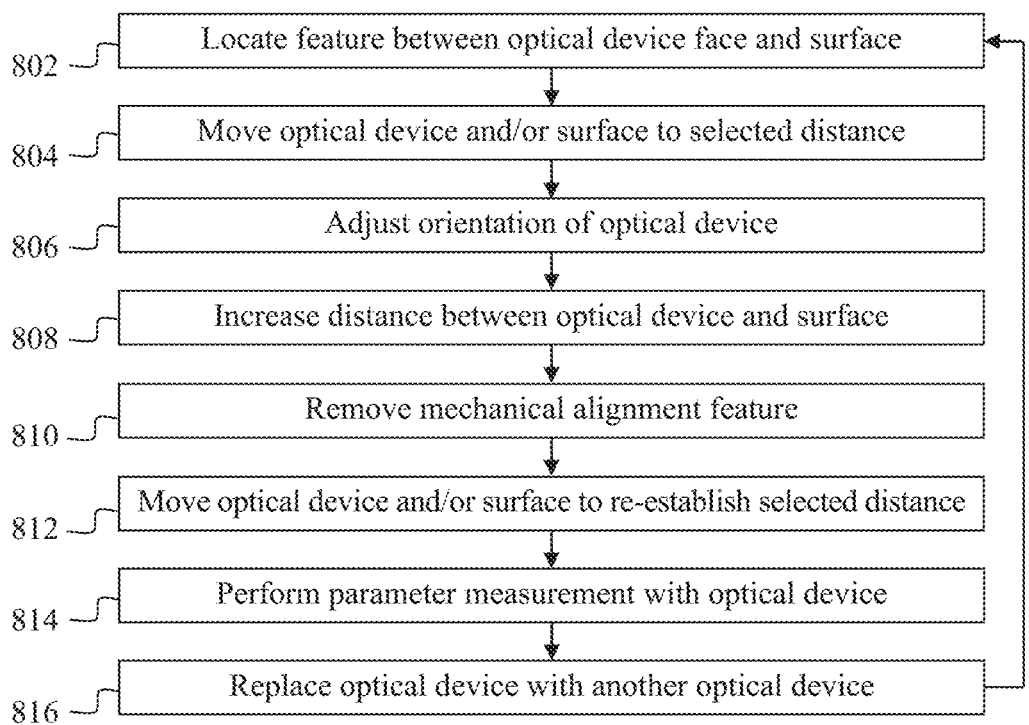
FIG. 8 is a flow chart illustrated a method for method for aligning an optical device with a surface configured to receive a liquid coating in accordance with exemplary embodiments.

Referring now to FIG. 8, an exemplary method 800 for method for aligning an optical device with a surface configured to receive a liquid coating is described in relation to FIGS. 1-6. Method 800 includes, at operation 802, locating a removable mechanical alignment feature between a face 201 of the optical device 200 and the surface 120. In certain embodiments, locating the removable mechanical alignment feature between a face 201 of the optical device 200 and the surface 120 includes applying the removable mechanical alignment feature to the face 201 of the optical device 200. In other embodiments, locating the removable mechanical alignment feature between a face 201 of the optical device 200 and the surface 120 may include applying the removable mechanical alignment feature to the surface 120. In either case, applying the mechanical alignment feature to a selected location may include retaining three projections on the selected location. For example, applying the mechanical alignment feature to a selected location may include adhering a substrate having opposite adhesive surfaces to the selected location and adhering the three projections to the substrate. Alternatively, the three projections have adhesive surfaces, and applying the mechanical alignment feature to a selected location may include adhering the three projections directly to the selected location. In exemplary embodiments, the optical device has a port on the face, and retaining three projections on the selected location includes positioning the port inside of a triangle defined by the three projections.

At operation 804, method 800 includes moving the optical device and/or the surface to establish a selected distance therebetween. For example, the optical device 200, seated within mechanical carriage 210, and/or the surface 120 may be moved to an operative configuration in which distance 215 is establish between the mechanical carriage 215 and the surface 120.

Method 800 may continue at operation 806 with adjusting the orientation of the optical device 200 to an aligned orientation based on a relationship between the mechanical alignment feature 300, the optical device 200, and the surface 120. In exemplary embodiments, adjusting the orientation of the optical device 200 to an aligned orientation based on a relationship between the mechanical alignment feature 300, the optical device 200, and the surface 120 includes contacting the mechanical alignment feature 300 with the surface 120 and the face 201.

At operation 808, method 800 includes increasing the distance between the optical device 200 and the surface 120. For example, the optical device 200, seated in the mechanical carriage 210 can be moved in the direction 221. Alternatively, or additionally, the surface 120 can be moved away from the optical device 200.

As shown, method 800 further includes, at operation 810, removing the mechanical feature 300 from the selected location, whether the face 201 or the surface 120.

Then, method 800 includes, at operation 812, moving back the optical device 200 and/or the surface 120 to re-establish the selected distance 205 therebetween. For example, the optical device 200, seated in the mechanical carriage 210 can be moved in the direction 222. Alternatively, or additionally, the surface 120 can be moved back to the operative configuration.

The method 800 for aligning an optical device 200 with a surface 120 configured to receive a liquid coating may further proceed with performing a parameter measurement of a liquid coating received on the surface 120 with the optical device 200, at operation 814.

Further, method 800 may include, at operation 816, replacing the optical device 200 with another optical device 200, such as a second optical device 200. As shown, operations 802-816 may then be repeated for the most recently installed optical device 200. In this manner, testing across different optical devices 200 is performed with a standardized distance 205.

Cross-referencing FIGS. 1-6, a low-cost assembly 400 for performing standardized parameter measurements is described. An exemplary assembly 400 includes a plurality of optical devices 200, each having a face 201. Further, the exemplary assembly 400 includes a mechanical carriage 210 connected to a surface 120 configured to receive a layer of a liquid coating. An exemplary mechanical carriage 210 is configured to move to and from an operative configuration located at a set distance 215 and orientation with respect to the surface 120. Further, the mechanical carriage 210 is configured to receive and hold each optical device 200, one at a time.

An exemplary assembly 400 further includes a removable mechanical alignment feature 300 that is configured to be temporarily retained on the face 210 of each optical device 200. Also, an exemplary assembly 400 includes an adjustment feature 240 configured to adjust an orientation of each optical device 200 within the mechanical carriage 210 to an aligned orientation based on a relationship between the surface 120 and the mechanical alignment feature 300.

With the structure of assembly 400, testing of liquid coatings on surface 120 may be performed at a standardized distance 205 from the optical device face 201 to the surface 120, and to the layer of liquid coating thereon. Further, assembly 400 provides for such standardization through a quick and easy process of temporarily holding the mechanical alignment feature 300 between the optical device face 201 and the surface 120, such as on the optical device face 201. Therefore, the assembly 400 is an inexpensive solution to the issue of non-standardization of testing performed by different optical devices by different users.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method for measuring a parameter of a liquid coating, the method comprising:
providing a mechanical carriage connected to a surface configured to receive a layer of the liquid coating, wherein the mechanical carriage is configured to move along a line parallel to the surface to and from an operative configuration located at a set distance and orientation with respect to the surface;
locating an optical device in the mechanical carriage;
adjusting an orientation of the optical device within the mechanical carriage to an aligned orientation based on a relationship between the surface and a mechanical alignment feature on the optical device; and
performing a parameter measurement operation with the optical device in the aligned orientation.

2. The method of claim 1, wherein adjusting the orientation of the optical device within the mechanical carriage to an aligned orientation comprises contacting the mechanical alignment feature with the surface when the mechanical carriage is in the operative configuration.

3. The method of claim 1, wherein locating the optical device in the mechanical carriage comprises locating the optical device in the mechanical carriage while retracted from the operative configuration, and wherein the method further comprises moving the mechanical carriage to the operative configuration before adjusting the orientation of the optical device within the mechanical carriage to the aligned orientation.

4. The method of claim 3, further comprising, after adjusting the orientation of the optical device within the mechanical carriage to the aligned orientation,
retracting the mechanical carriage from the operative configuration;
removing the mechanical alignment feature from the optical device; and
returning the mechanical carriage to the operative configuration before performing the parameter measurement operation with the optical device in the aligned orientation.

5. The method of claim 1, further comprising applying the mechanical alignment feature to a face of the optical device before extending the mechanical carriage to the operative configuration.

6. The method of claim 5, wherein applying the mechanical alignment feature to a face of the optical device comprises retaining three projections on the face of the optical device.

7. The method of claim 6, wherein retaining three projections on the face of the optical device comprises:
adhering a substrate having opposite adhesive surfaces to the face of the optical device; and
adhering the three projections to the substrate.

8. The method of claim 1, wherein adjusting the orientation of the optical device within the mechanical carriage to an aligned orientation based on a relationship between a mechanical alignment feature on the optical device and the surface comprises visually observing the mechanical alignment feature and a reflection of the mechanical alignment feature in the surface.

9. The method of claim 1, wherein micrometers interconnect the optical device to the mechanical carriage, and wherein adjusting the orientation of the optical device within the mechanical carriage to an aligned orientation based on a relationship between a mechanical alignment feature on the optical device and the surface comprises independently adjusting the micrometers.

10. The method of claim 1, wherein the optical device is a spectrophotometer, and wherein performing a parameter measurement process with the optical device in the aligned orientation comprises obtaining a wet color measurement.

11. A method for measuring a parameter of a liquid coating, the method comprising:
providing a mechanical carriage connected to a surface configured to receive a layer of the liquid coating, wherein the mechanical carriage is configured to move from a retracted configuration to an operative configuration located at a set distance and orientation with respect to the surface;
locating an optical device in the mechanical carriage when in the retracted configuration;
moving the mechanical carriage to the operative configuration;
while in the operative configuration, adjusting an orientation of the optical device within the mechanical carriage to an aligned orientation based on a relationship between the surface and a mechanical alignment feature on the optical device;
after adjusting the orientation of the optical device within the mechanical carriage to the aligned orientation, retracting the mechanical carriage from the operative configuration to the retracted configuration and removing the mechanical alignment feature from the optical device; and
returning the mechanical carriage to the operative configuration before performing a parameter measurement operation with the optical device in the aligned orientation.

* * * * *